US010225777B2

(12) United States Patent
Singh et al.

(10) Patent No.: US 10,225,777 B2
(45) Date of Patent: Mar. 5, 2019

(54) APPARATUS, SYSTEMS AND METHODS FOR AN ENHANCED HANDOVER MECHANISM AND CELL RE-SELECTION

(71) Applicant: APPLE INC., Cupertino, CA (US)

(72) Inventors: Ajoy K. Singh, Milpitas, CA (US); Deepankar Bhattacharjee, Milpitas, CA (US); Raj S. Chaugule, Santa Clara, CA (US); Sanjay K. Verma, San Jose, CA (US); Kwangho Byun, San Jose, CA (US)

(73) Assignee: APPLE INC., Cupertino, CA (US)

( * ) Notice: Subject to any disclaimer, the term of this patent is extended or adjusted under 35 U.S.C. 154(b) by 147 days.

(21) Appl. No.: 15/166,708

(22) Filed: May 27, 2016

(65) Prior Publication Data

US 2017/0094574 A1  Mar. 30, 2017

Related U.S. Application Data

(60) Provisional application No. 62/235,217, filed on Sep. 30, 2015.

(51) Int. Cl.
| | |
|---|---|
| *H04W 36/16* | (2009.01) |
| *H04W 36/00* | (2009.01) |
| *H04W 36/24* | (2009.01) |
| *H04W 36/14* | (2009.01) |
| *H04W 48/18* | (2009.01) |
| *H04W 84/12* | (2009.01) |

(52) U.S. Cl.
CPC ....... *H04W 36/16* (2013.01); *H04W 36/0022* (2013.01); *H04W 36/245* (2013.01); *H04W 36/0083* (2013.01); *H04W 36/14* (2013.01); *H04W 48/18* (2013.01); *H04W 84/12* (2013.01)

(58) Field of Classification Search
CPC ............ H04W 36/0022; H04W 36/16; H04W 36/245
See application file for complete search history.

(56) References Cited

U.S. PATENT DOCUMENTS

| | | | |
|---|---|---|---|
| 2013/0012209 A1 | 1/2013 | Hall et al. | |
| 2014/0281760 A1* | 9/2014 | Yoshizawa | G06F 11/3065 714/57 |

(Continued)

FOREIGN PATENT DOCUMENTS

DE    10 2013 215 728    10/2014

*Primary Examiner* — Yemane Mesfin
*Assistant Examiner* — Henry Baron
(74) *Attorney, Agent, or Firm* — Fay Kaplun & Marcin, LLP

(57) ABSTRACT

A user equipment (UE), base station and a corresponding method for receiving historical data from a diagnostic server, receiving location data of the UE, determining a probability of a failed handover during a call based on the historical data and the location data, comparing the probability of the failed handover to a threshold value and initiating a call handover to a wireless local area network when the probability of the failed handover exceeds the threshold value. Also, a UE, base station and corresponding method for determining if one or more UEs have an active voice over WiFi call or if the UEs are registered with a Internet protocol ("IP") multimedia subsystem ("IMS") over WiFi and biasing a cell reselection procedure of the UE to select a cell of a packet switched network such as LTE.

17 Claims, 7 Drawing Sheets

(56) References Cited

U.S. PATENT DOCUMENTS

| | | |
|---|---|---|
| 2014/0370842 A1 | 12/2014 | Abtin et al. |
| 2015/0038140 A1 | 2/2015 | Kilpatrick, II et al. |
| 2015/0208309 A1* | 7/2015 | Taneja ............... H04W 36/0066 455/426.1 |
| 2015/0257062 A1* | 9/2015 | Hara ................. H04W 36/0083 370/331 |
| 2016/0014793 A1 | 1/2016 | Klemp et al. |

* cited by examiner

APPARATUS, SYSTEMS AND METHODS FOR AN ENHANCED HANDOVER MECHANISM AND CELL RE-SELECTION

PRIORITY CLAIM/INCORPORATION BY REFERENCE

This application claims priority to U.S. Provisional Application 62/235,217 entitled "Apparatus, Systems and Methods for an Enhanced Handover Mechanism and Cell Re-Selection," filed on Sep. 30, 2015, the entirety of which is incorporated herein by reference.

BACKGROUND

Wireless communication systems are rapidly growing in usage. Further, wireless communication technology has evolved from voice-only communications to also include the transmission of data, such as Internet and multimedia content. A user equipment ("UE") may be configured to establish a connection with different types of networks through the use of wireless communications protocols. Accordingly, based upon the capabilities of the hardware and software of the UE, the connection may be made with these different types of networks. For instance, the network may be a Universal Mobile Telecommunication System ("UMTS") or Long Term Evolution ("LTE") network for data connectivity, or the network may be a Global System for Mobile Communications ("GSM") or Code Division Multiple Access ("CDMA") network for voice connectivity.

LTE, commonly referred to a "4G LTE," is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols or 2G/3G networks, such as GSM/UMTS protocols and CDMA 2000 1× (e.g., 1×RTT or simply "1×") wireless communication protocols. Each of these different types of networks and protocols may be termed radio access technologies ("RATs").

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Since voice calls in GSM, UMTS and CDMA2000 utilize circuit switched data transmissions, carriers adopting the LTE standard need to re-engineer their voice call network. For instance, Voice over LTE ("VoLTE") uses an IP multimedia subsystem ("IMS") network having specific profiles for control and media planes of voice service on LTE. Accordingly, VoLTE communications result in the voice service being delivered as data flows within the LTE data bearer. Thus, there is no requirement for the legacy circuit-switched voice network to be maintained. Furthermore, VoLTE communications has up to three times more voice and data capacity than UMTS networks and up to six times more than GSM networks.

Furthermore, the 3GPP has standardized Single Radio Voice Call Continuity ("SRVCC") to provide easy handovers from an LTE network to a GSM/UMTS network. Accordingly, SRVCC functionality is needed within VoLTE systems to enable a VoLTE call to be seamlessly handed over to legacy circuit switched voice systems, such as 2G/3G networks. However, SRVCC handover failures continue to be significant, especially in cell edge cases, where the coverage for LTE and legacy RATs is typically insufficient. Thus, the SRVCC handover failures not only result in call failures, but also decreased audio quality resulting in unsatisfactory user experience.

SUMMARY

Described herein are apparatus, systems and methods for an enhanced handover mechanism. For instance, the exemplary embodiments may pertain to enhanced SRVCC call reliability through the use of Interworking Wireless Local Area Network ("iWLAN") handover mechanisms. Furthermore, described herein are apparatus, systems and methods for enhanced cell re-selection and traffic steering. For instance, further exemplary embodiments may pertain to caller-aware cell re-selection for wireless network voice calls.

A method may comprise receiving, by a user equipment ("UE"), historical data from a diagnostic server, receiving location data of the UE, determining a probability of a failed handover (e.g., an SRVCC handover) during a call based on the historical data and the location data, comparing the probability of the failed handover to a threshold value, and initiating a call handover to a wireless local area network when the probability of the failed handover exceeds the threshold value.

Also described herein is a device comprising a non-transitory memory having a program stored thereon, an application processor and a baseband processor. The execution of the program causes the processor to perform operations comprising receiving historical data from a diagnostic server, receiving location data of the UE, determining probability of a failed handover during a call based on the historical data and the location data, comparing the probability of the failed handover to a threshold value, initiating a call handover to a wireless local area network when the probability of the failed handover exceeds the threshold value.

Further described herein is a method comprising receiving, by a base station or a UE, historical data from a diagnostic server, receiving, by the base station or the UE, location data from a UE, calculating a pre-threshold value based on the historical data and location data, transmitting the pre-threshold value to the UE, receiving an IRAT evaluation request from the UE, evaluating a wireless local area network based on the location data, and recommending a WiFi link preference to the UE for a call handover. It may be noted that the above-described method may be performed at either the base station (e.g., eNodeB) or, alternatively, at the device (e.g., the UE) without requiring any change in the base station.

Further described herein is a method comprising establishing, by a UE, a voice over WiFi call within a network, the network including a wireless local area network and an LTE network, determining a state of the voice over WiFi call, determining that the UE is registered with an IMS, selecting an LTE network cell over a legacy network cell for the UE to camp on, and initiating a call handover from a wireless local area network to the LTE network based on the state of the voice over WiFi call.

Further described herein is a system comprising determining, by a base station, a state of the voice over WiFi calling by a plurality of UEs within a network, the network including a wireless local area network and an LTE network, determining an IMS registration of each of the plurality of the UEs, setting a priority for network traffic steering based on the IMS registrations and/or a number of active WiFi calls on the network, adjusting the priority based on a change in one of the IMS registrations and the number of active WiFi calls on the network, and broadcasting a system information block ("SIB") message to the plurality of UEs based on the priority.

DETAILED DESCRIPTION

Figure 1:
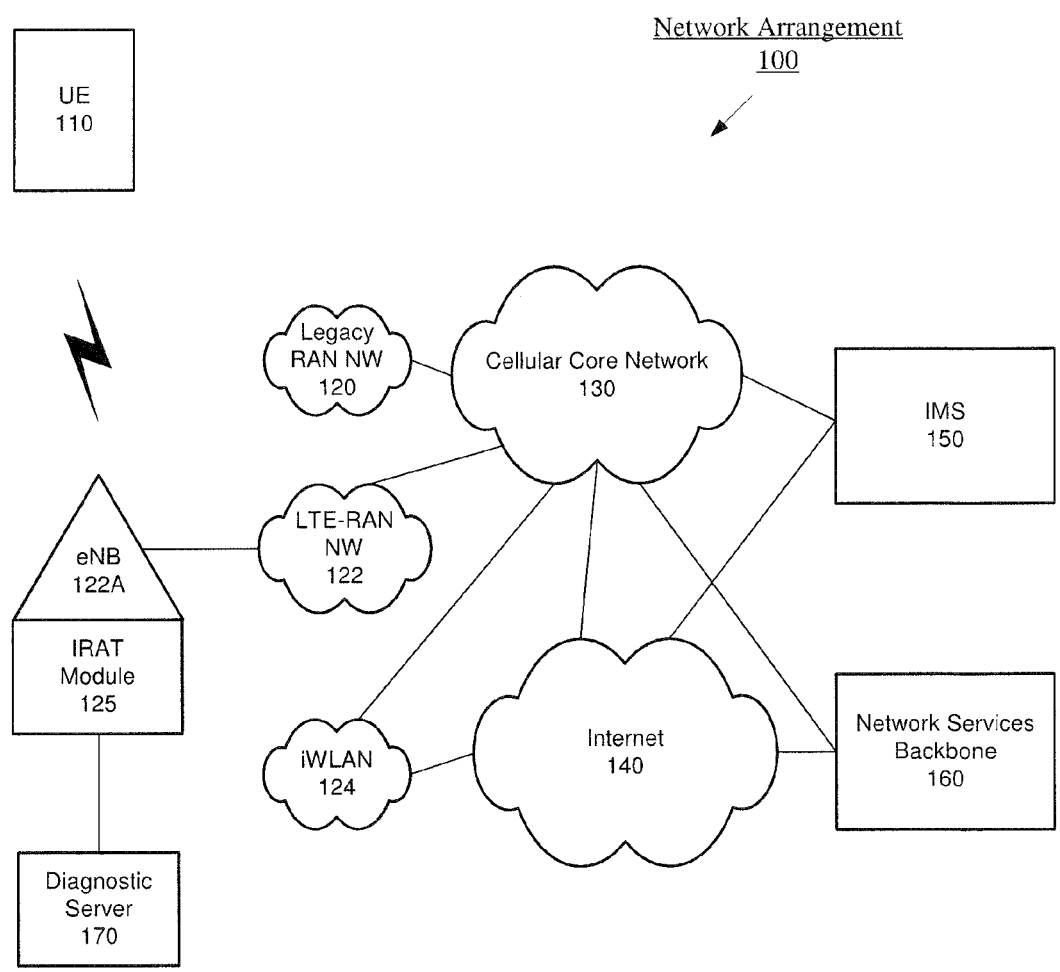
FIG. 1 shows an exemplary network arrangement for an enhanced handover mechanism, according to various embodiments described herein.

The exemplary embodiments may be further understood with reference to the following description and the appended drawings, wherein like elements are referred to with the same reference numerals. The exemplary embodiments describe an apparatus, system and method for an enhanced handover mechanism from an LTE network to a wireless local network. For instance, the exemplary embodiments may pertain to enhanced SRVCC call reliability through the use of exemplary WLAN handover mechanisms. Furthermore, described herein are apparatus, systems and methods for enhanced cell re-selection and traffic steering. For instance, further exemplary embodiments may pertain to caller-aware cell re-selection for wireless network voice calls.

In the exemplary embodiments, the mobile device will be described as a UE associated with LTE networks. However, it will be understood by those skilled in the art that UEs operating in accordance with other network standards may also implement the exemplary embodiments in accordance with the functionalities and principles described herein. These network standards may also include further evolutions of the current network standards, e.g., 5G standards.

The LTE-RAN may be a portion of the cellular networks deployed by cellular providers or operators (e.g., Verizon, AT&T, Sprint, T-Mobile, etc.). These networks may include, for example, base client stations (Node Bs, eNodeBs, HeNBs, etc.) that are configured to send and receive traffic from UEs that are equipped with an appropriate cellular chip set. In addition to the LTE-RAN, the operators may also include legacy RANs that are generally labeled as 2G and/or 3G networks and may utilize circuit switched voice calls and packet switched data operations. Those skilled in the art will understand that the cellular providers may also deploy other types of networks, including further evolutions of the cellular standards, within their cellular networks.

As will be described in greater detail below, operators may deploy an IP Multimedia Subsystem ("IMS"). The IMS may be generally described as an architecture for delivering multimedia services to the UE using the IP protocol. In the context of the LTE-RAN, the IMS may provide an exemplary UE with voice capabilities (e.g., VoLTE) as well as Short Messaging Services ("SMS") capabilities. In the context of legacy RANs, the IMS may also provide the UE with SMS services.

In addition to the LTE-RAN and 2G/3G networks, the exemplary UE may also be capable of integrating WiFi communications into its operation, wherein the UE may seamlessly handover between Wi-Fi and mobile networks. For instance, 3GPP has worked out specifications for the integration of WiFi and 3GPP networks using the "iWLAN" standard. This is also known as S2b based WLAN interworking. An IWLAN-capable device may use GSM signaling for voice services over circuit-switched UMTS Terrestrial Radio Access Network ("UTRAN") access but Session Initiation Protocol ("SIP") signaling for voice services over WiFi access or Voice over LTE.

According to the exemplary embodiments, the systems and methods described herein provide for an enhanced solution to use alternative iWLAN technology. For instance, the systems and methods may allow for a call to reliably continue on iWLAN (e.g., WiFi) with a similar audio experience whenever a handover from a VoLTE call is necessary. Accordingly, the UE is able to utilize WiFi coverage to continue the call over WiFi-based IMS infrastructure as an alternative to choosing the less reliable 3G radio coverage and infrastructure.

As will be described in greater detail below, the exemplary embodiments may utilize historical data that is periodically reported by the UE to a diagnostic server or other network component. This historical data may include previously reported SRVCC call failures occurring on the current serving cell, as well as measurement threshold information, handover threshold information, prior triggering events, etc.

Within the field of LTE measurement and reporting, events (e.g., A1-A5, B1-B2, etc.) may be triggered as the radio conditions of a network changes. For instance, A1-A5 events are based on Reference Signal Received Power ("RSRP") and Reference Signal Received Quality ("RSRQ") information. For example, an A1 event may trigger when the serving cell conditions become better than a threshold value, an A2 event may trigger when the serving cell conditions become worse than the threshold value, etc. B1-B2 events are inter-system LTE events that are triggered based on the various conditions specific to a different RAT (e.g., UMTS, GSM, CDMA2000, etc.). A B1 event may trigger when the conditions at an inter-RAT neighbor become better than a threshold value. A B2 event may trigger when the serving cell conditions become worse than a first threshold value and the conditions at an inter-RAT neighbor become better than a second threshold value. Thus, each occurrence of any of these events may be reported to the diagnostic server and stored as historical data.

Accordingly, the UE may use both its current location and this historical data received from the diagnostic server to evaluate whether the SRVCC call failures are a significant issue with its current serving cell and its configured neighboring cell(s). The UE may determine that the SRVCC call failures are significant based on a comparison to a predetermined threshold for a failure rate percentage (e.g., greater than 5% failure rate by the operator). Thus, once the SRVCC call failures are deemed to be a significant problem, the UE may then handover the call to iWLAN instead of attempting the SRVCC to one of the legacy RATs.

FIG. 1 shows an exemplary network arrangement 100 according to various embodiments described herein. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, etc. The UE 110 may be configured to perform cellular and/or WiFi functionalities and may include processors (e.g., application processors, baseband processors, etc.), memory arrangements, displays, transceivers, etc. It should also be understood that an actual network arrangement may include any number of UEs being used by any number of users and being associated with any number of these users where the user may be associated with one or more UEs. That is, the example of one UE 110 is only provided for illustrative purposes.

The UE 110 may be configured to communicate directly with one or more networks. In this example, the networks with which the UE 110 may communicate are a legacy radio access network ("RAN") 120, a LTE RAN (LTE-RAN) 122, and a iWLAN 124. More specifically, the legacy RAN 120 may be a circuit switched network, e.g., GSM, UMTS, CDMA, 1xRTT, 1x, etc. In this example, each of the networks 120-124 is a wireless network with which the UE 110 may communicate wirelessly. However, it should be understood that the UE 110 may also communicate with other types of networks and may also communicate using a wired connection.

With regards to the exemplary embodiments, the UE 110 may establish a connection with the LTE-RAN 122 to, among other functionalities, perform data transfers, voice calls and exchange SMS messages with the LTE network. In another example, the UE 110 may communicate with the legacy RAN 120 to perform some or all of the same functionalities, depending, for example, on the availability of a connection between the UE 110 and the LTE-RAN 122.

The network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

As described above, the network arrangement 100 also includes an IMS 150 to provide the UE 110 with voice capabilities (e.g., VoLTE) and messaging capabilities (e.g., SMS). The UE 110, in order to use the services provided by the IMS 150, needs to register with the IMS 150. The IMS 150 may include a variety of components to accomplish these tasks. For example, a typical IMS 150 includes a Home Subscriber Server ("HSS") that stores subscription information for a user of the UE 110. This subscription information is used to provide the correct multimedia services to the user. The IMS 150 may communicate with the cellular core network 130 and the Internet 140 to provide the multimedia services to the UE 110. The IMS 150 is shown in close proximity to the cellular core network 130 because the cellular provider typically implements the functionality of the IMS 150. However, it is not necessary for this to be the case such as when the IMS 150 is provided by another party. Thus, the network arrangement 100 allows the UE 110 to perform functionalities generally associated with computers and cellular networks.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks. The network services backbone 160 may interact with the UE 110 and/or the networks 120, 122, 124, 130, and 140 to provide these extended functionalities.

The network services backbone 160 may be provided by any entity or a set of entities. In one example, the network services backbone 160 is provided by the supplier of the UE 110. In another example, the network services backbone 160 is provided by the cellular network provider. In still a further example, the network services backbone 160 is provided by a third party unrelated to the cellular network provider or the supplier of the UE 110.

The exemplary embodiments relate to the UE 110 connecting to LTE-RAN 122 via an eNB 122A. Initially, the UE 110 may establish a connection to the LTE-RAN 122. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122. More specifically, the UE 110 may associate with a specific access point (e.g., the eNB 122A of the LTE-RAN 122).

As described above, when the UE 110 is associated with the LTE-RAN 122, the UE 110 may register with the IMS 150 to receive certain services such as VoLTE and SMS services. As part of registering with the IMS 150, the UE 110 will configure its internal stack to an LTE protocol stack. In addition, since the services will be provided using the IP based network, the UE 110 may also receive an IP address.

The network arrangement 100 may also include a diagnostic server 170 that is in communication either directly or indirectly with the eNB 122A and the UE 110. The diagnostic server 170 may receive and store historical data and statistics related to the network 100. For instance, the diagnostic server 170 may store information such as measurement statistics, handover threshold data, and the failure percentages of SRVCC call handovers. The failures may be categorized in any number of manners, such as, in general, specific to the UE 110, specific to the eNB 122A, specific to neighboring eNBs, etc. Accordingly, the information stored in the diagnostic server 170 may be retrieved by the eNB 122A and used in the calculation of further threshold information. One exemplary threshold may be termed a pre-B2 event threshold. As noted above, the B2 event may be triggered when the serving cell conditions become worse than a first threshold value and the conditions at an inter-RAT ("IRAT") neighbor become better than a second threshold value. Accordingly, the pre-B2 threshold may be used in order to take action before the B2 threshold is reached. As will be described in greater detail below, the exemplary eNB 122A may include an IRAT module 125 to evaluate the WiFi conditions of the iWLAN 124. It should be noted that the network arrangement 100 shows the diagnostic server 170 being directly connected to the IRAT module 125 of the eNB 122A. This is only exemplary and the diagnostic server 170 may be located anywhere within the network arrangement 100, including, but not limited to, within the cellular core network 130, as a separate component connected to the cellular core network 130 and/or the Internet 140 (e.g., in the same manner as the IMS 150 and the network services backbone 160), as a component of the network services backbone 160, etc.

Figure 2:
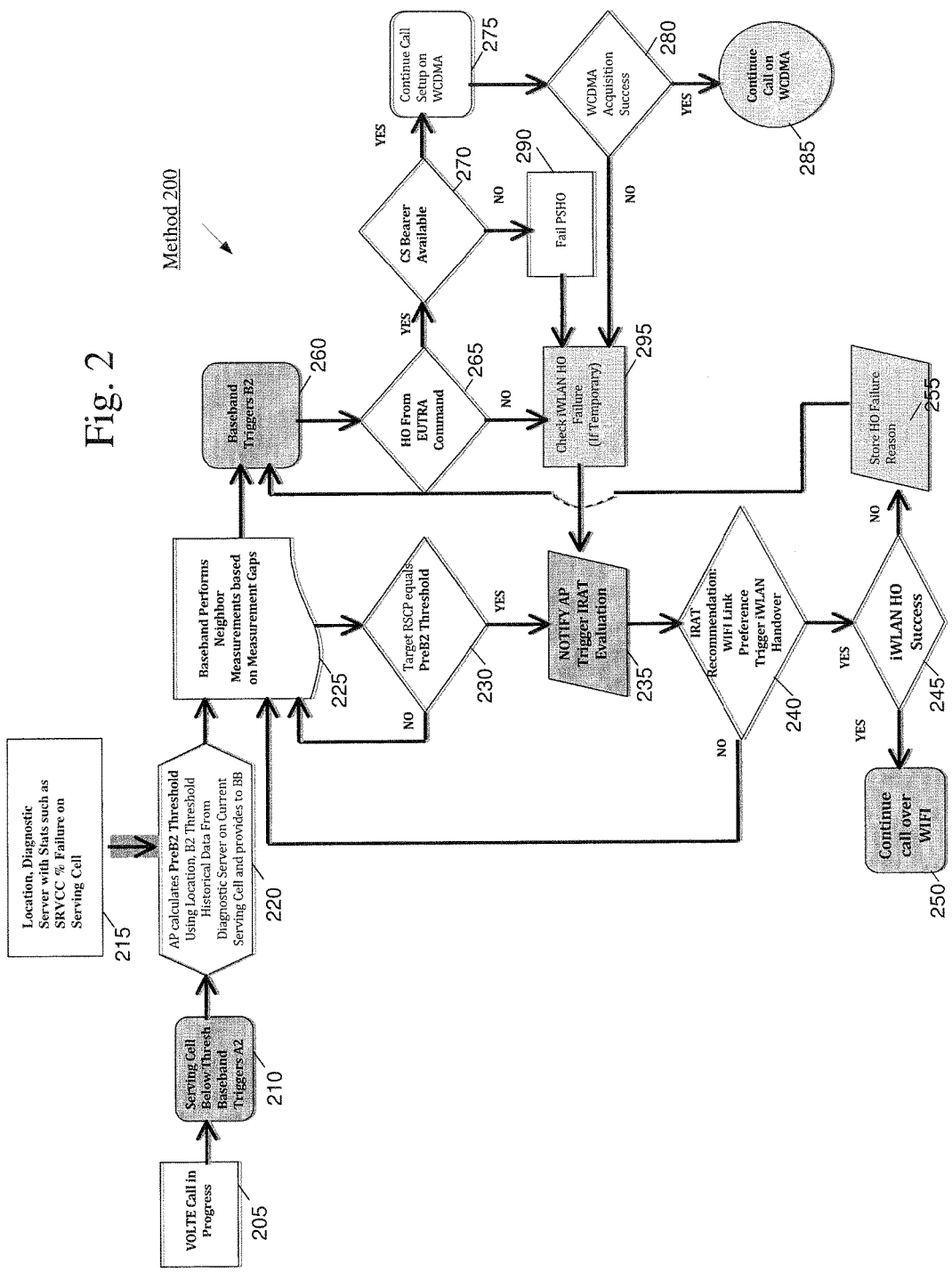
FIG. 2 shows an exemplary method for an enhanced handover mechanism a mobile device, such as the UE, in a communication with a plurality of wireless networks, such as LTE-RAN and iWLAN, according to various embodiments described herein.

FIG. 2 shows an exemplary method 200 for an enhanced handover mechanism a mobile device, such as the UE 110, in a communication with the eNB 122A and a plurality of wireless networks, such as LTE-RAN 122 and the iWLAN 124, according to various embodiments described herein. Thus, the method 200 will be described with reference to the components of the network arrangement 100 of FIG. 1.

According to one exemplary embodiment of the method 200, in 205 the UE 110 may have a VoLTE call in progress. During the VoLTE call, the UE 110 may monitor the current radio conditions and report the information to the eNB 122A. In the exemplary embodiments, some example radio condition parameters will be used to describe the exemplary operation. However, it should be understood that these parameters are only exemplary and other parameters that provide information about the radio conditions may also be used.

In 210, the UE 110 may encounter poor LTE coverage and trigger an A2 event. As noted above, an A2 event may be triggered when the conditions associated with the current serving cell (e.g., eNB 122A) become worse than a threshold value, for example, based on RSRP or RSRQ information. As result of the A2 event, the UE 110 may be instructed by the eNB 122A to perform measurements for neighboring cells. For instance, the neighboring cells may be signaled via one or more system information blocks ("SIBs"). The UE 110 may periodically report the results of the measurements to the diagnostic server 170 and the cellular core network 130.

In 215, the UE 110 may retrieve location data of the UE 110 as well as previously recorded historical data from the diagnostic server 170. As discussed above, this historical data may include previously reported SRVCC call failures occurring on the current serving cell, as well as measurement threshold information, handover threshold information, prior triggering events (e.g., B2 events), etc.

In 220, the UE 110 or the eNB 122A may calculate a pre-B2 threshold based on the location data and the historical data. The pre-B2 threshold may be defined as having a threshold value less than the threshold required by the UE 110 to trigger and report a B2 event to the eNB 122A. Once, the UE 110 calculates the pre-B2 threshold, this value may then be reported to the baseband processor of the UE 110. As described above, when the B2 threshold is reached, this may trigger the UE 110 to perform an SRVCC handover to the legacy RAN 120 to maintain the current call. However, the pre-B2 threshold is calculated and used to potentially have the UE 110 attempt to avoid the SRVCC handover and rather, perform a handover to the IWLAN 224 to maintain the call. As described above, the pre-B2 threshold may be calculated based on current measurements made by the UE 110 and the historical data maintained by the diagnostic server 170. For example, if the historical data maintained by the diagnostic server 170 shows that for the current serving cell (e.g., eNB 122A), there is a greater than 10% SRVCC handover call failure, the pre-B2 threshold may be set such that there is a greater likelihood that there will be an attempt to hand the call over to the IWLAN 224. In contrast, if the failure rate is relatively low (e.g., less than 1%), the pre-B2 threshold will be set such that it is less likely that a call handover to the IWLAN 224 will occur. Those skilled in the art will understand that the failure rates are only exemplary and different thresholds for failure rates and different types of parameters may be used to set the B2 threshold.

In 225, the baseband processor of the UE 110 may perform measurements on neighboring cells. At any time during the measurement cycle, the radio conditions may trigger a B2 event in 260 (e.g., the received signal code power ("RSCP") of an inter-RAT neighbor is better than a threshold value). However, as described above, prior to the radio conditions triggering a B2 event, radio conditions may satisfy the pre-B2 threshold as shown in 230. That is, while performing the neighboring cell measurements, the UE 110 is constantly comparing the measurements against the pre-B2 threshold in 230 such that the pre-B2 action may occur prior to the measurements triggering the B2 event in 260.

In 230, if the target neighboring cell satisfies the threshold (e.g., has an RSCP value that satisfies the pre-B2 threshold calculated in 220), then the UE 110 in 235 may notify the eNB 122A to determine if an iWLAN handover can be triggered on a locally available WiFi network (e.g., iWLAN 124). If no target neighboring cell has an RSCP value equal to the pre-B2 threshold, then the UE 110 may return to 225 and continue performing neighbor cell measurements.

In 240, the eNB 122A may utilize the IRAT module 125 to evaluate the current WiFi conditions (e.g., the signal strength, historical Real-time Transport Protocol ("RTP") packet loss in downlink/uplink, etc.) of any available WLANs in the vicinity of the UE 110. Furthermore, the eNB 122A may also consider device motion and whether the current WiFi source may be used to perform a handover to iWLAN. Accordingly, during 240, the IRAT module of the eNB 122A may recommend the use of WiFi for the UE 110 if there is sufficient WiFi signal strength and an iWLAN handover is supported by the UE 110. If the IRAT module 125 does not recommend WiFi usage to the UE 110, then the UE 110 may return to 225 and continue performing neighbor cell measurements. As will be described below, the IRAT evaluation functionalities may be implemented within the exemplary UE 110.

In 245, the UE 110 may attempt an iWLAN handover to transfer the current call in progress from VoLTE to WiFi. If the iWLAN handover is successful, in 250 the UE 110 continues the call over the WiFi network (e.g., IWLAN 124) and thus avoids the need to use an SRVCC handover to an alternative RAT (e.g., a legacy 2G/3G RAN). However, if the iWLAN handover is unsuccessful, in 255 the UE 110 may record and store the reason for the handover failure for future assessment. This information may also be reported to the diagnostic server 170 and stored as further historical data for use during a subsequent VoLTE call and handover process.

Returning to 225, if the iWLAN handover is not successful, the UE 110 will continue to make the neighboring cell measurements and a B2 event may be triggered by the measurements. In 260, the UE 110 triggers and reports a B2 event based on either the neighbor measurements performed in 225 or the failed iWLAN handover in 255 (e.g., the B2 threshold may be satisfied during the time that the UE 110 is attempting to handover to the IWLAN 224). As noted above, a B2 event is triggered when the radio conditions at the serving cell become worse than a first threshold and the conditions at an IRAT neighboring cell become better than a second threshold (e.g., the LTE RAN 122 is likely to drop the VoLTE call and the legacy RAN 120 has better radio conditions). The B2 event may be reported to the eNB 122A, wherein the eNB 122A may request a Mobility Management Entity ("MME") for a handover request. Accordingly, the MME may complete the resource reservation with a Mobile Switching Center ("MSC") and legacy RAN 120 infrastructure. The MME and MSC may be functionalities that are implemented by the cellular core network 130.

In 265, once resources have been reserved, the eNB 122A may transmit a handover from evolved UMTS Terrestrial Radio Access ("E-UTRA") command (e.g., MobilityFromEUTRACommand) with CS bearers required to set up the call on a legacy RAN 120. However, if the E-UTRA command is not available, instead of causing the call to fail, in 295 the eNB 122A may check if the iWLAN handover failure was temporary and re-attempt the iWLAN handover by returning to 235. Thus, an SRVCC failure may be avoided.

Even if the E-UTRA command is available in 265, the actual CS bearer required for the SRVCC call may not be available. Experience with some network implementations shows that certain networks may not send CS bearers to the UE 110, but only the handover from E-UTRA command to perform a PS handover. The availability of the CS bearer is determined in 270. In 270, if no CS bearers are available in the legacy RAN 120, the handover to the legacy RAN 120 may fail in 290. However, the exemplary embodiments allow for the call to potentially be continued because, in 295, the eNB 122A may check if the iWLAN handover failure was temporary and again, re-attempt the iWLAN handover by returning to 235. Since IMS features may not be deployed over legacy RANs, the IRAT evaluation in 235 (and thus iWLAN handover in 250) may be activated when the UE 110 has sufficient WiFi coverage. Therefore, this IRAT evaluation in 235 may save the call in progress that would have been otherwise dropped in the absence of CS bearers on the legacy RAN 120.

To finish with the flow in FIG. 2, if CS bearers are available in a legacy RAN 120 in 270, the call setup may continue on a legacy RAN 120, such as Wideband CDMA ("WCDMA") in 275. If the UE 110 is able to acquire WCDMA in 275 after receiving the handover from E-UTRA command from an LTE serving system (e.g., MME), the UE 110 may then attempt to complete the handover to UTRA. For instance, the UE 110 may transmit a handoverToUTRAComplete command to a WCDMA cell and attempt to continue the call on WCDMA after setting up radio bearers. In 280, the UE 110 may determine whether the WCDMA acquisition was successful. If the UE fails to acquire the legacy RAN 120 cell, in 295 the eNB 122A may check if the iWLAN handover failure was temporary and the IRAT evaluation in 235 (and thus iWLAN handover in 250) may be activated when the UE 110 has sufficient WiFi coverage.

Thus, it should be seen from this exemplary flow, that there may be multiple manners of continuing the current VoLTE call by a handover to an IWLAN, even if the SRVCC will fail. The first attempt to handover to IWLAN may occur prior to the B2 threshold being satisfied (e.g., when the pre-B2 threshold is satisfied). However, there may also be subsequent attempts to handover to IWLAN after the B2 threshold is satisfied when various failures occur during attempting to connect via the legacy circuit switched network.

It should be noted that in the exemplary embodiments, the thresholds were described with reference to thresholds associated with operation of an LTE network, e.g., B2, A2, etc. Those of skill in the art will understand that this is only exemplary and that the exemplary embodiments may be applied to any packet switched cellular network that may attempt to handover a voice call to a WLAN network, rather than to a legacy circuit-switched network under certain conditions. Thus, the exact nature of the thresholds may be dependent on the particular type of packet switched cellular network.

Figure 3:
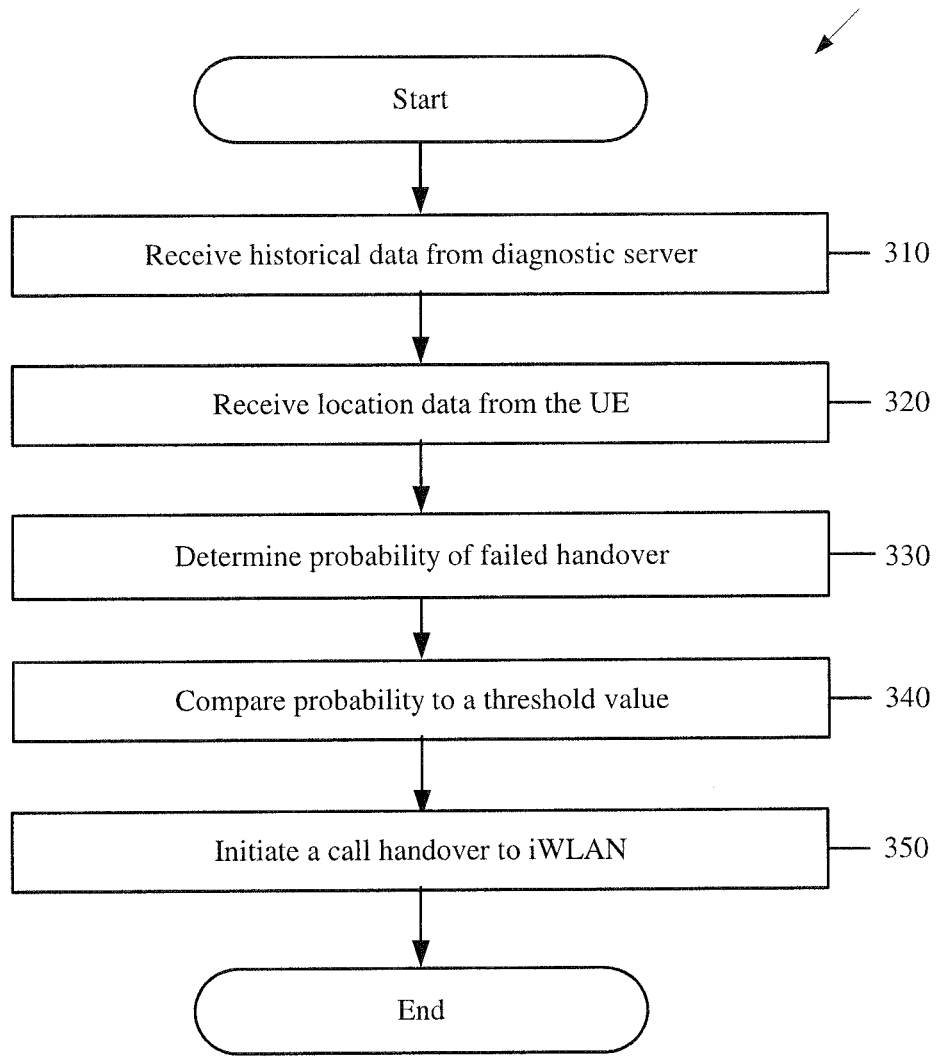
FIG. 3 shows an exemplary method for an enhanced handover mechanism a mobile device, such as the UE, in a communication with a plurality of wireless networks, such as LTE-RAN and iWLAN, according to various embodiments described herein.

FIG. 3 shows an exemplary method 300 for an enhanced handover mechanism by a mobile device, such as the UE 110, in a communication with the eNB 122A and a plurality of wireless networks, such as LTE-RAN 122 and the iWLAN 124, according to various embodiments described herein. Thus, it is noted that the entirety of method 300 may be performed by the UE 110 of FIG. 1, as well as the components of the UE 110, such as application processors and baseband processors. That is, the processes described above with reference to the method 200 may be performed by various components within the network arrangement 100. The method 300 shows operations that may be performed by the UE 110 in accomplishing the handover of the method 200.

According to one exemplary embodiment of the method 300, in 310 the UE 110 may receive historical data from a diagnostic server 170 via the eNB 122A. As described above, the historical data may be related to the particular serving cell to which the UE 110 is currently attached and the serving cell's neighboring cells. However, the historical data may also cover a larger geographical area including multiple cells. An example of the types of historical data that the UE 110 may receive is the failure rate for SRVCC handovers, measurement thresholds, etc. Other types of historical data may also be received, for example, the failure rate may be broken down by network load or particular radio conditions, etc.

In 320, the UE 110 may receive or derive location data for the UE 110. Those skilled in the art will understand that there are any number of manners that a UE may generate or receive location data, including, but not limited to using GPS data, based on triangulation of received signals, or by simply receiving location information from the eNB 122A. In 330, the UE 110 may determine a probability of a failed handover during a call based on the historical data and the location data. For example, the UE 110 may determine that in the specific location that the UE 110 is currently in and being attached to the particular serving cell, the network had an SRVCC handover failure rate of 10%.

In 340, the UE 110 may compare the probability of the failed handover to a threshold value. For example, the threshold may be set to an 5% failure rate, meaning that if the probability of failure is above the threshold, the UE 110 should attempt to handover to a WLAN network before attempting an SRVCC handover, while if below the threshold, the UE 110 may default directly to SRVCC handover. Part of the process 340 may also include the calculation of the pre-B2 threshold as described above based on the historical data and the measurement of the radio conditions that may be used to trigger the IWLAN handover attempt. In the example started above, with a threshold of 5% and a historical failure rate of 10%, the UE 110 will attempt to force a handover to an IWLAN network prior to attempting the SRVCC handover. Thus, in 350, the UE 110 may initiate a call handover to a wireless local area network, such as the iWLAN 124, because the probability of the failed SRVCC handover exceeds the threshold value.

Figure 4:
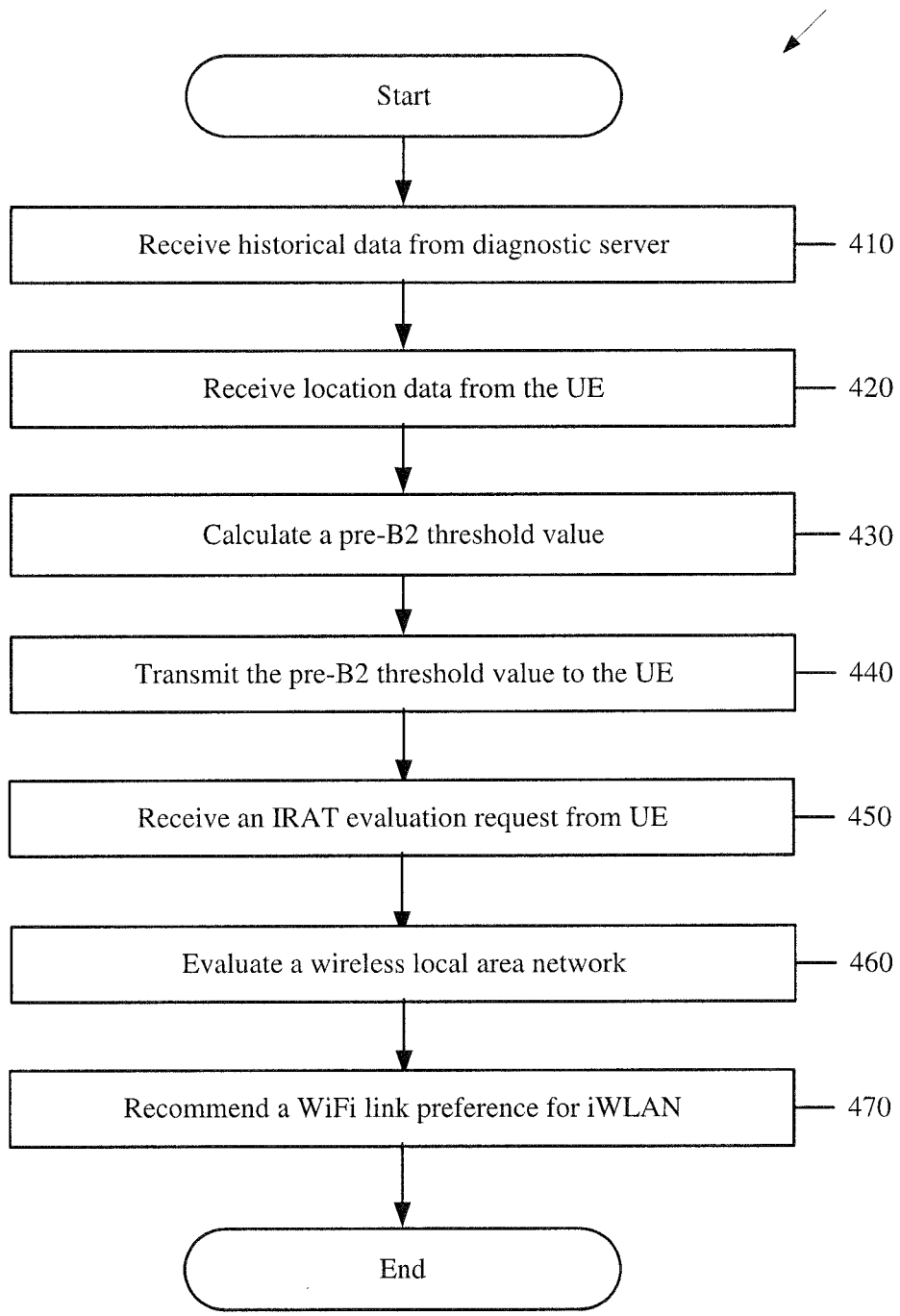
FIG. 4 shows an exemplary method for an enhanced handover mechanism by a base station, such as the eNB, in a communication with the UE and a plurality of wireless networks, such as LTE-RAN and the iWLAN, according to various embodiments described herein.

FIG. 4 shows an exemplary method 400 for an enhanced handover mechanism by a base station, such as the eNB 122A, in a communication with the UE 110 and a plurality of wireless networks, such as LTE-RAN 122 and the iWLAN 124, according to various embodiments described herein. Thus, it is noted that the entirety of method 400 may be performed by the eNB 122A of FIG. 1, as well as the components of the eNB 122A, such as the IRAT module 125. Similar to the method 300 that may be performed exclusively by the UE 110, the method 400 shows operations that may be performed exclusively by the eNB 122A in accomplishing the handover of the method 200. As should be understood from a comparison of the methods 300 and 400, there are some processes of accomplishing the handover of method 200 that may be performed by either the UE 110 or the eNB 122A.

According to one exemplary embodiment of the method 400, in 410 the eNB 122A may receive historical data from diagnostic server 170. In 420 the eNB 122A may receive location data from the UE 110 or calculate a location for the UE based on received signals from the UE 110. In 430 the eNB 122A may calculate a pre-threshold value, such as the pre-B2 threshold, based on the historical data and location data. In 440 the eNB 122A may transmit the pre-threshold value to the UE 110. In 450 the eNB 122A may receive an IRAT evaluation request from the UE 110. In 460 the IRAT module 125 of the eNB 122A may evaluate a wireless local area network, such as the iWLAN 124, based on the location data of the UE 110. In 470 the eNB 122A may recommend a WiFi link preference to the UE 110 for a call handover from VoLTE to iWLAN.

As noted above, the exemplary UE 110 may support communications over both VoLTE and WiFi. Furthermore the UE 110 may also support handovers of a WiFi call to a VoLTE call as long as a target cell supports VoLTE. According to the exemplary embodiments described herein, the UE 110 may use 3GPP-compliant S2b-based solutions to support handover from a WiFi call to a VoLTE call, and vice versa.

The above describes methods for accomplishing a voice call handover from an LTE RAN 122 to an IWLAN 124. The following describes manners of accomplishing a handover of a voice call from the IWLAN 124 to the LTE RAN 122. Those skilled in the art will understand that under some circumstances a user of the UE 110 may start a voice call while connected to a WLAN. However, the user may then become mobile and reach the edge of the WLAN, but still wants to maintain the voice call. Legacy networks (e.g., UMTS, CDMA, etc.) may not have quality of service ("QoS") enabled IMS VoIP services. Therefore, to maintain the call, the UE 110 may only handover from WiFi to VoLTE-capable networks. The UE 110 may perform various operations to increase the likelihood that the active call is maintained by biasing the UE 110 to camp on a cell of an LTE network.

During cell re-selection, the UE 110 may camp on the best available cell. Exemplary cell re-selection systems and methods may be enhanced to improve the standby time of the UE 110 as well as the camping cell quality performance. For instance, the UE 110 may use S and R criteria during the cell re-selection process. The S-criteria may include the device-measured quality of the surrounding cells. The R-criteria may include a ranking of each of the cells, wherein the UE 110 may select the best cell as the next serving cell.

The UE 110 may utilize any number of inputs during the cell re-selection process. These inputs may include priority and radio link quality. With regards to priority, the wireless network may notify the UE 110 of cell re-selection priority through the use of SIB broadcasts. For instance, SIB5 may indicate inter-frequency priority, SIB6 may indicate LTE-WCDMA priority, SIB7 may indicate LTE-GSM priority, etc. With regards to radio link quality, the UE 110 may consider signal strength (RSCP, RSRP, etc.), signal quality (Ec/Eno, RSRQ, etc.). Accordingly, the wireless network may provide various threshold values to allow re-selection using SIB broadcast messages. The UE 110 may trigger a cell re-selection process when the signal strength and/or signal quality of the serving cell meets certain threshold values.

Due to the exponential growth in data traffic, carriers are eager to utilize deployed networks as efficiently as possible. Carriers may implement a network controlled idle-mode steering mechanism to steer network traffic to deployed heterogeneous networks. Furthermore, carriers may control network based traffic steering by broadcasting optimal threshold and priority values in various SIB broadcast messages that the UE 110 may use for idle-mode cell re-selection.

Current cell re-selection processes do not take into account the state of WiFi coverage for the UE 110 for a possible handover of a WiFi call (e.g., iWLAN 124). In the case of cellular preferred carriers, the UE 110 may only camp on WiFi when cell coverage is marginal or non-existent. However, when cellular coverage is marginal, the UE 110 is more likely to camp on a legacy RAN 120 (e.g., GSM or UMTS) since the relative radio conditions on the legacy RAT is typically better than those on the LTE-RAN 122. If the user of the UE 110 initiates a voice call over a WiFi network and then travels beyond the coverage, the UE 110 will not be able to handover the call in progress from WiFi to cellular. Thus, the call will then be dropped.

In order to address these problems, the exemplary embodiments described herein may consider the IMS registration state and/or the state of the WiFi call during the cell re-selection process. Furthermore, the exemplary embodiments described herein may also consider the state of WiFi call of several devices camped on an eNB or Radio Network Controller ("RNC") during the network steering process.

Figure 5:
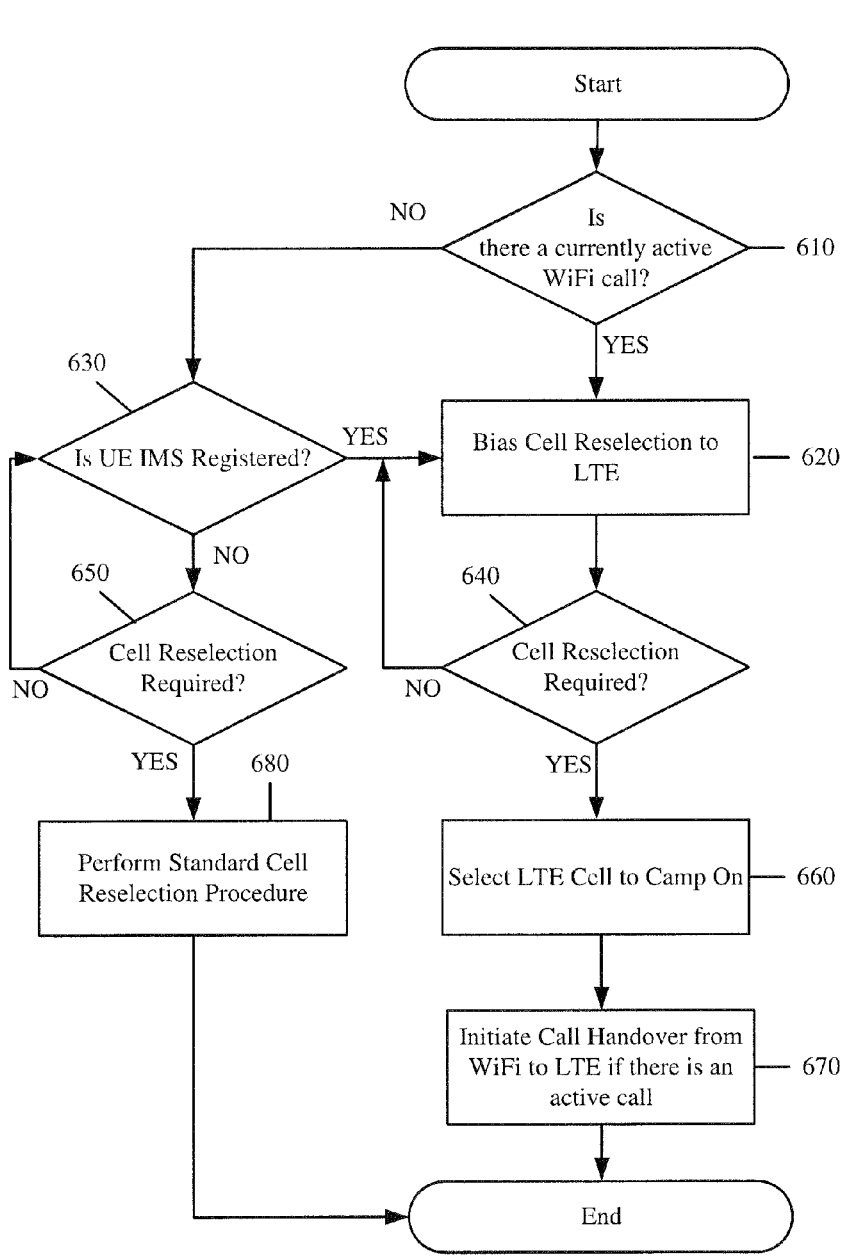
FIG. 5 shows an exemplary method for enhanced cell re-selection according to various embodiments described herein.

FIG. 5 shows an exemplary method 600 for enhanced cell re-selection by a mobile device, such as the UE 110, in a communication with the eNB 122A and a plurality of wireless networks, such as LTE-RAN 122 and the iWLAN 124, according to various embodiments described herein. Thus, it is noted that the entirety of method 600 may be performed by the UE 110 of FIG. 1, as well as the components of the UE 110, such as application processors and baseband processors.

Thus, the embodiment of FIG. 5 may be a cell reselection process that is controlled by the UE 110. The method of FIG.

5 may include two specific scenarios where the UE 110 will be biased for the cell reselection of an LTE RAN 122 cell over the cell of a legacy RAN 120. The first scenario is when there is an active WiFi call. As described above, if there is an active WiFi call, the only way to preserve the active call if the user leaves the coverage of the WiFi network is to pass the call to another packet switched network, e.g., an LTE network. If the UE 110 camps on a legacy RAN 120 cell, and the user leaves the WiFi coverage area, the call will be dropped.

The second scenario is when the UE 110 is IMS registered over WiFi. Again, because the UE 110 is IMS registered, it is more likely that the first scenario may occur, therefore, even if a call is not currently active, the UE 110 should prefer reselection to LTE to avoid dropped calls. For example, in the second scenario, the UE 110 may be IMS registered and currently connected to the iWLAN 124. However, while moving within the coverage area of the iWLAN 124, the UE 110 may move to a location where, if having to switch to a cellular network, the UE 110 is now outside the coverage area of the previous cell (e.g., LTE RAN 122 cell or legacy RAN 120 cell) to which it was connected. Thus, the UE 110 may perform a cell reselection for the cellular network while the UE remains connected to the iWLAN 124. Thus, if the cell reselection were to select a cell of the legacy RAN 120, and the UE 110 later started an active WiFi call, the WiFi call would be dropped when handing over to cellular. On the other hand, if the cell reselection procedure selected a cell of the LTE RAN 122, the later connected active WiFi call would be transferred to the LTE RAN 122 upon handover. Thus, even if the UE 110 does not have a currently active call, because it is IMS registered, there is a higher likelihood that the UE 110 may have an active call when cellular handover is required.

According to one exemplary embodiment of the method 600, it is considered that the UE 110 is currently connected to the iWLAN 124. In 610 the UE 110 may determine if there is an active WiFi call (the first scenario). If there is no active WiFi call, in 630, the UE 110 may determine if the UE 110 is currently IMS registered over WiFi (the second scenario). Those skilled in the art will understand that if the UE 110 is IMS registered, the UE 110 will have a saved context indicating the IMS registration. If there is currently an active WiFi call (610) or the UE 110 is IMS registered (630), the method continues to 620 where the UE 110 biases the cell reselection to LTE. As described above, the UE 110 will bias the cell reselection to LTE because the UE 110 prefers that an active call not be dropped during the reselection and handover process. Thus, by biasing the cell reselection to LTE, it is less likely that a packet switched WiFi call will be dropped because the call may be handed over to the packet switched LTE RAN 122, whereas the circuit switched legacy network 120 would not be able to continue the WiFi call.

After the cell reselection is biased to LTE in 620, in 640 the UE 110 determines if a cell reselection is required. Those skilled in the art will understand that there are many different reasons for the cell reselection procedure to be initiated (e.g., based on cell measurements). If the cell reselection procedure is initiated in 640, in 660 the UE 110 should select an LTE cell on which to camp. Those skilled in the art will understand that while the cell reselection procedure is biased to the LTE RAN 122, it is not a guarantee that the LTE RAN 122 will be selected. For example, the LTE bias means that if there is an LTE RAN 122 cell available that meets the minimum requirements for communicating with the UE 110, the LTE RAN 122 cell will be selected. However, there may be instances, when there is no available LTE RAN 122 cell. In these instances, the UE 110 will camp on a cell of the legacy RAN 120, if available.

In 670, if the UE 110 is leaving the coverage area of the iWLAN 124, the UE 110 may initiate a call handover from the iWLAN 124 to the LTE RAN 122 when the UE 110 has an active WiFi call (e.g., is in the first scenario). As described above, this first scenario may occur before or after the cell reselection procedure. Thus, the biasing of the cell reselection to the LTE RAN 122 preserves the WiFi call when the UE 110 leaves the WiFi coverage area.

Returning to 630, if there is neither an active call (no first scenario) nor is the UE 110 IMS registered over WiFi (no second scenario) and a cell reselection procedure is required in 650, the UE 110 will perform the standard cell reselection procedure. That is, the cell reselection procedure may not be biased to the LTE RAN 122. Those skilled in the art will understand that the standard cell reselection procedure may encompass many different methods for cell reselection and any of these methods may be used. The point being that in the standard cell reselection procedure there is no biasing toward the LTE RAN 122 because of an active WiFi call or IMS registration.

Figure 6:
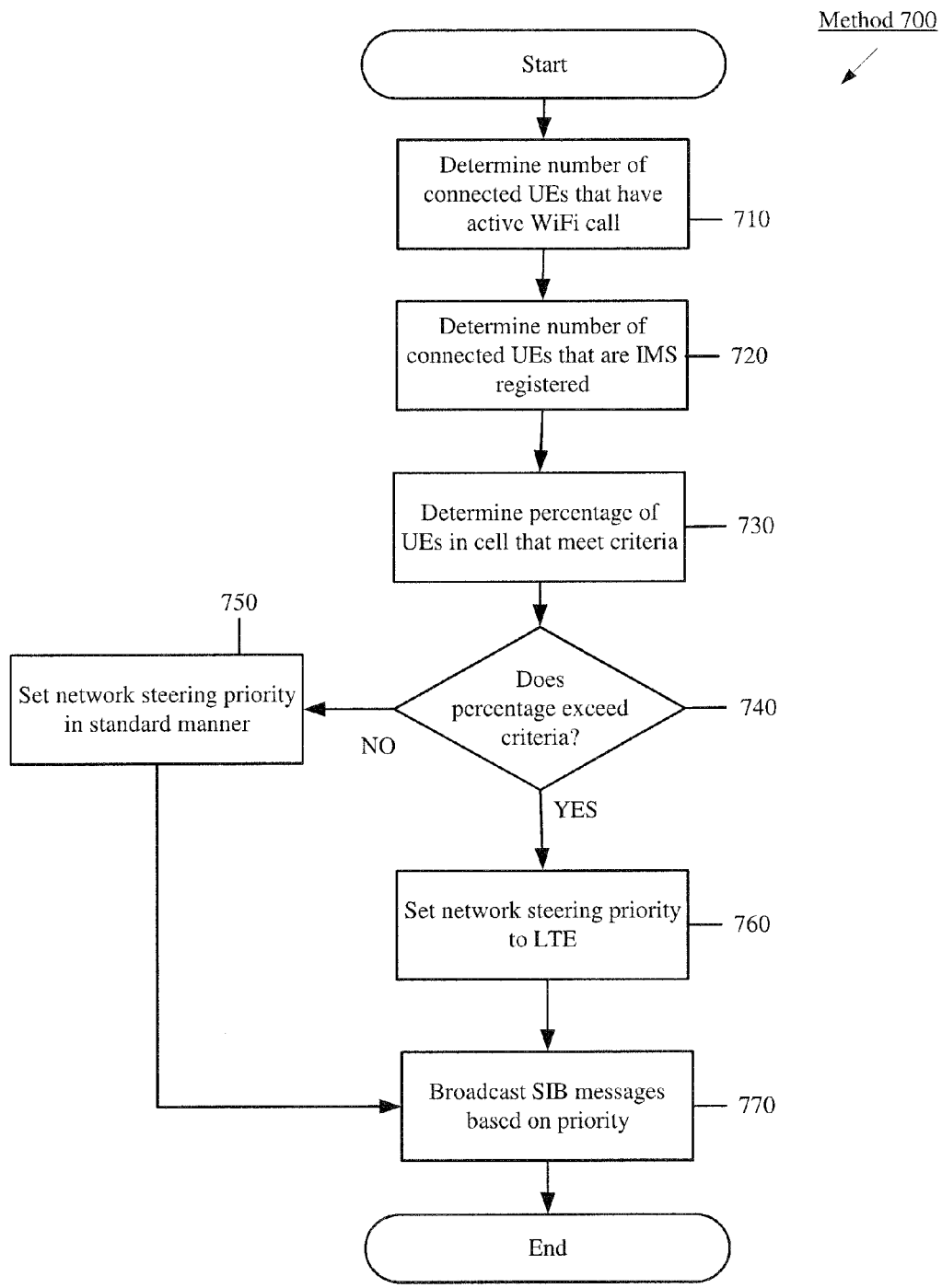
FIG. 6 shows an exemplary method for enhanced network traffic steering according to various embodiments described herein.

FIG. 6 shows an exemplary method 700 for enhanced network traffic steering by a base station, such as the eNB 122A, in a communication with the UE 110 and a plurality of wireless networks, such as LTE-RAN 122 and the iWLAN 124, according to various embodiments described herein. Thus, it is noted that the entirety of method 700 may be performed by the components of the LTE RAN 122, including the eNB 122A.

According to one exemplary embodiment of the method 700, in 710 the eNB 122A may determine the number (if any) of UEs that are currently are camped on the eNB 122A that have active WiFi calls. It should be understood that the LTE RAN 122 (and therefore the eNB 122A) may have a direct or indirect connection to the iWLAN 124 to make this determination. For example, the LTE RAN 122 may connect to the iWLAN 124 via the cellular core network 130 or via the Internet 140 to query the iWLAN 124 if any of the UEs that are currently connected to the eNB 122A have active WiFi calls. In another example, the LTE RAN 122 may query the IMS 150 to determine if any of the UEs that are currently connected to the eNB 122A have active WiFi calls. It should be noted that the eNB 122A and the LTE RAN 122 will have a list of UEs (based on a unique identifier such as IMSI, MAC address, etc.) that are currently connected to the eNB 122A. In 720, the eNB 122A will determine the number of UEs that are currently camped on the eNB 122A that are IMS registered via WiFi. This determination in 720 may be performed in the same manner as was described above for determining the active WiFi calls in 710.

In 730, the eNB 122A will determine the percentage of connected UEs that meet the criteria, e.g., that have active WiFi calls and/or are WiFi IMS registered. It should be noted that the percentage may be determined in any number of manners. For example, the percentage may be based on the number of UEs meeting the first scenario compared to the total number of UEs connected to the eNB, the number of UEs meeting the second scenario compared to the total number of UEs connected to the eNB, a combined number of UEs meeting the first scenario and second scenario compared to the total number of UEs connected to the eNB, etc. In addition, while the exemplary embodiments are described with reference to a percentage value, the value may also be expressed in other mathematical terms such as a ratio, etc. In 740, the eNB 122A determines if the percentage determined in 730 exceeds a threshold value. This threshold value may be set based on any number of factors. In one exemplary embodiment, the threshold may be set to a percentage value of 20%. However, this is only exemplary and any other threshold may be used.

If the percentage exceeds the threshold in 740, this means that the eNB 122A should bias the network steering priority to LTE. As described above, the UEs will ultimately perform the cell reselection procedure, but the eNB 122A may bias the UEs selection by setting priorities for the cell reselection. When the percentage is high (e.g., above the threshold), the eNB 122A may determine that it the UEs should be biased toward selecting the LTE RAN 122 for the reasons that were described above (e.g., to avoid dropping WiFi calls when handing over from WiFi to cellular). Thus, if the percentage exceeds the threshold in 740, the eNB 122A will set the network steering priority to LTE in 760. This will cause the eNB 122A to broadcast SIB messages indicating this priority to all the UEs that are currently camped on the eNB 122A in 770. Thus, the eNB 122A may bias the connected UEs to prefer reselection to cells of the LTE RAN 122.

If the percentage does not exceed the threshold in 740, the eNB 122A may set the network steering priority in a standard manner. Again, the standard manner may encompass different methods of setting the network steering priority, but it does not include biasing toward LTE because of active WiFi calls and/or WiFi IMS registration. Similar to the above described network steering method that biases toward LTE, the eNB 122A will also broadcast SIB messages indicating the standard priority in 770.

Figure 7:
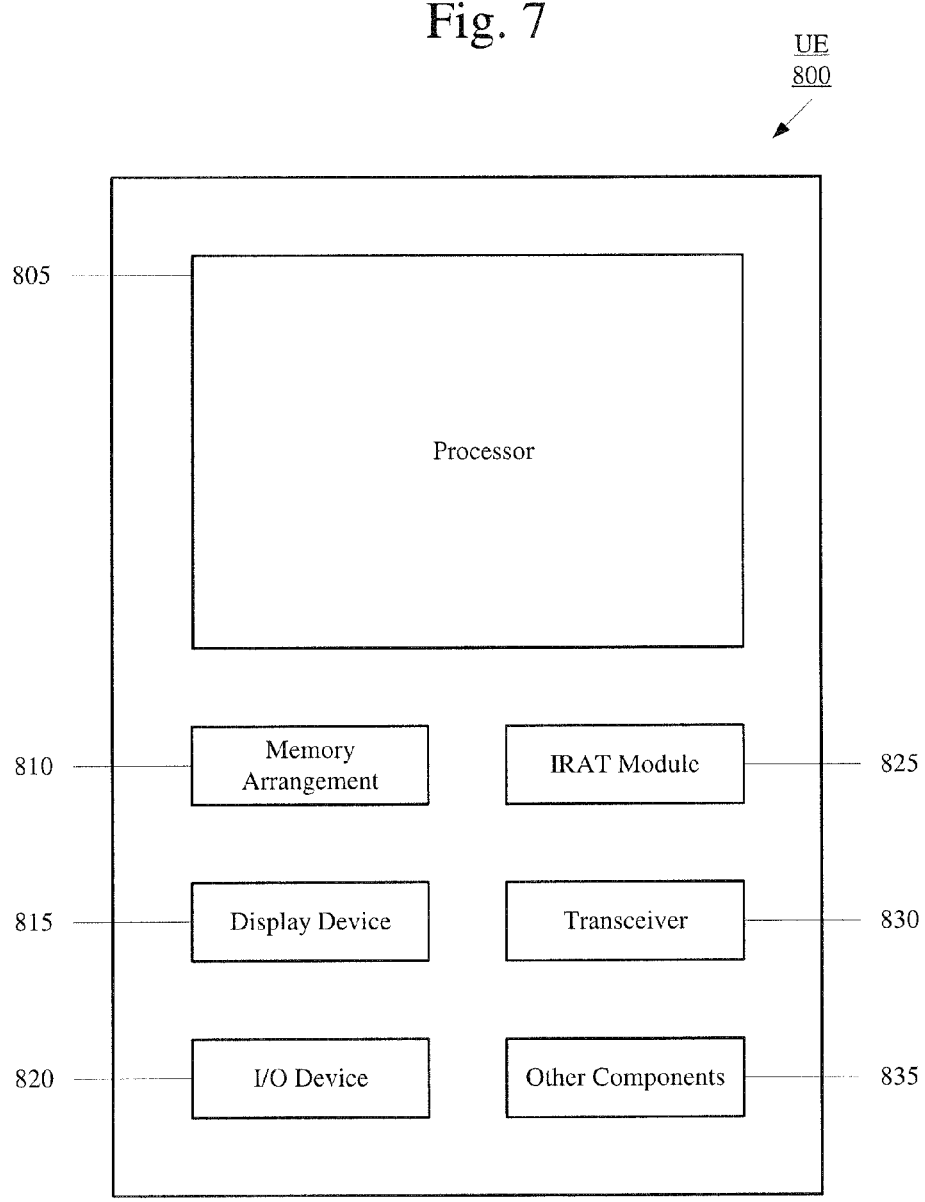
FIG. 7 shows an exemplary UE according to various embodiments described herein.

FIG. 7 shows an exemplary UE 800 according to various embodiments described herein. The UE 800 may represent any electronic device that is configured to perform wireless functionalities and may be representative of the UE 110 depicted in FIG. 1. Accordingly, the UE 800 may be a portable device such as a smartphone, a tablet, a phablet, a laptop, a wearable, etc. In another example, the UE 800 may be a client stationary device such as a desktop terminal. The UE 800 may be configured to perform cellular and/or WiFi functionalities. The UE 800 may include a processor 805, a memory arrangement 810, a display device 815, an input/output (I/O) device 820, an IRAT module 825 a transceiver 830, and other components 835. The other components 835 may include, for example, an audio input device, an audio output device, a battery, a data acquisition device, ports to electrically connect the UE 800 to other electronic devices, etc.

The processor 805 may be configured to execute a plurality of applications of the UE 800. It should be noted that the above noted applications each being an application (e.g., a program) executed by the processor 805 is only exemplary. The functionality associated with the applications may also be represented as a separate incorporated component of the UE 800 or may be a modular component coupled to the UE 800, e.g., an integrated circuit with or without firmware. In addition, in some UEs, the functionality described for the processor 805 is split among two processors, a baseband processor and an applications processor. The exemplary embodiments may be implemented in any of these or other configurations of a UE.

The memory 810 may be a hardware component configured to store data related to operations performed by the UE 800. Specifically, the memory 810 may store data related to various applications. The display device 815 may be a hardware component configured to show data to a user while the I/O device 820 may be a hardware component that enables the user to enter inputs. It should be noted that the display device 815 and the I/O device 820 may be separate components or integrated together such as a touchscreen.

The IRAT module 825, as noted above, may be used to evaluate WiFi conditions of a wireless network, such as the iWLAN 124. Similar to the IRAT module 125 of the eNB 122A of FIG. 1, the IRAT module 825 may implement IRAT evaluation functionalities on the UE 800. According to this embodiment, the IRAT module 825 will allow the UE 800 to decide between operating over the WiFi network versus operating over a cellular network. While the IRAT module 825 may reside on the UE 800, a SRVCC (e.g., LTE to CS) handover decision may still be implemented by an eNodeB (e.g., eNB 122A). For instance, the UE 800 may be responsible for sending measurement reports to eNB 122A, the UE 800 may also have the option to initiate WiFi handover before the network triggers SRVCC handover if the UE 800 knows that a SRVCC handover is most likely going to fail. The UE 800 may determine the probability of SRVCC handover failure based on location, B2 threshold and historical information in the same manner as described above wherein the eNB 122A performed this functionality.

The transceiver 830 may be a hardware component configured to transmit and/or receive data. That is, the transceiver 830 may enable communication with other electronic devices directly or indirectly through one or more networks based upon an operating frequency of the network. The transceiver 830 may operate on a variety of different frequencies or channels (e.g., set of consecutive frequencies) that are related to the VoLTE call functionality. Thus, one or more antennas (not shown) coupled with the transceiver 830 may enable the transceiver 830 to operate on the LTE frequency band as well as over a WiFi network.

It may be noted that the exemplary embodiments are described with reference to the LTE and LTE-Advanced communication system. However, those skilled in the art will understand that the exemplary embodiments may be applied to managing dynamic dormancy timers within any wireless communication schemes including those having different characteristics from the LTE scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

The invention claimed is:

1. A method, comprising:
   at a user equipment ("UE") connected to a packet switched cellular network:
   receiving historical data from a diagnostic server, the historical data including handover data for call handovers occurring on the packet switched cellular network;
   receiving location data of the UE;
   determining a probability of a failed handover from a first base station of the packet switched cellular network to a second base station of the packet switched cellular network during a call on the packet switched cellular network based on the historical data and the location data;
   comparing the probability of the failed handover to a threshold value;
   determining whether a wireless local area network is available to the UE at a location corresponding to the location data; and
   initiating a call handover from the packet switched cellular network to the wireless local area network when the probability of the failed handover exceeds the threshold value and the wireless local area network is available.

2. The method of claim 1, further comprising:
reporting, by the UE, further historical data to the diagnostic server.

3. The method of claim 1, further comprising:
determining, by the UE, that the wireless local area network is not available; and
initiating a second call handover to a further network, wherein the further network is a circuit switched network.

4. The method of claim 3, further comprising:
when the circuit switched network is not available, re-initiating the call handover to the wireless local area network.

5. The method of claim 1, wherein the historical data includes one of prior failed handover data or measurement thresholds.

6. The method of claim 1, wherein the comparing is performed when the UE is connected to an LTE network and the call is a Voice over LTE (VOLTS) call, the method further comprising:
receiving the threshold value from an evolved Node B (eNB) of the LTE network.

7. The method of claim 1, wherein the probability of the failed handover includes a first probability at a serving cell and a second probability at a neighboring cell.

8. The method of claim 1, wherein the failed handover is a Single Radio Voice Call Continuity ("SRVCC") call failure.

9. A user equipment ("UE") device comprising:
a non-transitory memory having a program stored thereon; and
a processor, wherein execution of the program causes the processor to perform operations comprising:
receiving historical data from a diagnostic server, the historical data including handover data for call handovers occurring on a packet switched cellular network,
receiving location data of the UE,
determining a probability of a failed handover from a first base station of the packet switched cellular network to a second base station of the packet switched cellular network during a call on the packet switched cellular network based on the historical data and the location data,
comparing the probability of the failed handover to a threshold value,
determining whether a wireless local area network is available to the UE at a location corresponding to the location data, and
initiating a call handover from the packet switched cellular network to the wireless local area network when the probability of the failed handover exceeds the threshold value and the wireless local area network is available.

10. The UE device of claim 9, wherein the processor includes a baseband processor and an application processor.

11. A method, comprising:
at a base station:
receiving historical data from a diagnostic server, the historical data including handover data for call handovers occurring on a packet switched cellular network;
receiving location data from a user equipment ("UE");
receiving, by the base station, an inter-radio access technology ("IRAT") evaluation request from the UE;
evaluating a wireless local area network based on the location data; and
recommending a WiFi link preference to the UE for a call handover from the packet switched cellular network.

12. The method of claim 11, further comprising:
calculating a pre-threshold value based on the historical data and location data; and
transmitting the pre-threshold value to the UE.

13. A method, comprising:
at user equipment ("UE"):
determining if the UE has an active voice over WiFi call or if the UE is registered with an internet protocol ("IP") multimedia subsystem ("IMS") over WiFi; and
when the UE has an active voice over WiFi call or is registered with the IMS over WiFi, biasing a cell reselection procedure of the UE to select a cell of a packet switched cellular network.

14. The method of claim 13, wherein the packet switched cellular network is one a Long Term Evolution (LTE) network or an LTE-Advanced network.

15. The method of claim 13, further comprising:
initiating the cell reselection procedure to select the cell of the packet switched cellular network.

16. The method of claim 15, further comprising:
when the cell selection procedure successfully selects the cell of the packet switched cellular network, initiating a handover of the voice over WiFi call to the packet switched cellular network.

17. The method of claim 15, further comprising:
when the cell selection procedure does not successfully select the cell of the packet switched cellular network, initiating the cell reselection procedure to select a cell of a circuit switched network.

* * * * *

UNITED STATES PATENT AND TRADEMARK OFFICE
CERTIFICATE OF CORRECTION

PATENT NO. : 10,225,777 B2
APPLICATION NO. : 15/166708
DATED : March 5, 2019
INVENTOR(S) : Ajoy K. Singh et al.

Page 1 of 1

It is certified that error appears in the above-identified patent and that said Letters Patent is hereby corrected as shown below:

In the Claims

Column (18), Line (38):
"cellular network is one a" should be "cellular network is one of a"

Signed and Sealed this
Twenty-first Day of April, 2020

Andrei Iancu
*Director of the United States Patent and Trademark Office*